United States Patent

[11] 3,556,084

| [72] | Inventor | Carl A. Budde<br>Los Angeles County, Calif. (8427 Balboa Blvd., Northridge, Calif. 91324) |
|---|---|---|
| [21] | Appl. No. | 686,675 |
| [22] | Filed | Nov. 29, 1967 |
| [45] | Patented | Jan. 19, 1971 |

[54] MEDICAL PULSE ANALYZING APPARATUS
3 Claims, 3 Drawing Figs.

| [52] | U.S. Cl. | 128/2.05 |
|---|---|---|
| [51] | Int. Cl. | A61b 5/02 |
| [50] | Field of Search | 128/2.05, 2.06 |

[56] References Cited
UNITED STATES PATENTS

| 2,439,495 | 4/1948 | Sturm | 128/2.05 |
|---|---|---|---|
| 2,452,799 | 11/1948 | Speaker et al. | 128/2.05UX |
| 3,103,214 | 9/1963 | Smith | 128/2.05 |
| 3,139,086 | 6/1964 | Botsch et al. | 128/2.05 |
| 3,149,628 | 9/1964 | Bolie | 128/2.05 |
| 3,338,234 | 8/1967 | Kleinerman et al. | 128/2.06 |

Primary Examiner—William E. Kamm
Attorney—Roger A. Marrs

ABSTRACT: The pulse analyzing apparatus disclosed herein includes a means for sensing the arterial pulse rate of a patient and generating an electrical signal in response to the presence of each pulse which is introduced to an indicating means via a circuit network comprising a driver, pulse shaper and low pass filter. Audible means are selectively coupled to the driver for producing a clicking sound indicating the pulse rate while meter circuitry is coupled to the low pass filter for providing a visual indication thereof. The pulse monitoring means is coupled to the indicator means at the output of the amplifier for rapidly providing evidence of pending circulatory disorder or failure in the form of visually displaying cardiac stroke/volume simultaneously with the display of pulse rate. Means are provided for measuring and displaying systolic blood pressure including switch means for selectively coupling the indicator across the low pass filter. This measuring means includes the use of a conventional occluding cuff.

INVENTOR.
CARL A. BUDDE
BY Roger G. Marrs

MEDICAL PULSE ANALYZING APPARATUS

BACKGROUND OF THE INVENTION

1. Field of the Invention

This invention relates to electronic medical equipment and, more particularly, to a novel electromechanical means for sensing and indicating arterial pulse rate and volume of a normal medical subject in a rapid and accurate manner and with a minimum of inconvenience for the purpose of circulatory diagnosis.

2. Description of the Prior Art

It has been a longstanding practice in the medical field for every doctor performing a diagnosis of a patient to know the patient's pulse rate. This is normally achieved by finding a place on the patient's body where the pulse rate in an artery may be physically felt and counted while watching a chronometer of some type. Usually, a pulse rate is averaged over a 10 second interval and arbitrarily multiplied by 6. For more accuracy, some physicians will count pulses for a 15 interval and multiply by 4.

In sensing the patient's pulse, the doctor or attendant will normally employ the wrist artery of the patient and place the patient's wrist between his thumb and fingers for sensing the pulse rate. Furthermore, there are a number of substances available on the commercial market that are inserted into the blood stream so that pressure transducers may be employed to sense the pulse rate. Also, the pulse rate may be sensed by employing a sphygmomanometer which is normally used for measuring blood pressure. However, if only the pulse rate is desired, it is simpler, of course, to merely feel for the artery and sense the pulse rate by use of the fingers.

Although the use of sphygmomanometers and pulse transducers are accurate, the equipment is relatively expensive and it is not convenient to assemble or install the equipment on the patient. The finger sensing method is simple but is relatively inaccurate inasmuch as the system depends upon a sense of feel which is of a varying nature from one individual to another. The ideal solution of determining pulse rate is the elimination of any computation to be done, either by the patient or by the doctor.

SUMMARY OF THE INVENTION

Accordingly, the problems and difficulties encountered with conventional pulse rate sensors and systems are obviated by the present invention which incorporates the latest advancements in solid state electronics to provide an improved pulse rate analyzer incorporating an audible and visual indication of a patient's pulse rate in a matter of seconds. A highly accurate reading is taken by an electronic sensor placed on the patient's finger which generates an electrical signal that is processed through electrical circuitry and displayed visually on the scale of a meter in heart-beats-per minute. Simultaneously, the heart beat is made audible over a loudspeaker coupled to the electronic circuitry in the form of an audible click. The patient's pulse rate is determined in a fraction of the usual time required while eliminating the possibility of human error. The continual audible monitoring that is provided by the analyzer offers immediate information on pulse variation without the need for an attending nurse. During periods of prolonged monitoring, the sensor can be taped to the patient's finger.

In one form of the invention, a pulse rate indicator means is provided having a cylindrical sensor incorporating a photoelectric circuit mounted therein for sensing the flow of blood in the patient's finger. The sensor is coupled to an amplifier via a buffer for amplifying the signals generated in response to the sensing of each pulse by the sensor. The amplified signals are introduced to a driver circuit and then to a loudspeaker for audible indication. Simultaneously, the amplified signals are supplied to a pulse shaper and through a low pass filter to a meter circuit for display on a precision meter which provides a visual count.

A pulse monitoring means can be coupled to the indicator means at the output of the amplifier for rapidly providing evidence of pending circulatory disorder or failure in the form of visually displaying cardiac stroke/volume simultaneously with the display of pulse rate.

Additionally, means for measuring and displaying systolic blood pressure is provided which may be selectively coupled to the indicator means across the low pass filter. This latter means includes the employment of a conventional occluding cuff.

Therefore, it is a primary object of the present invention to provide a novel medical electromechanical arterial pulse analyzer adapted to accurately selectively indicate by audible and visual means the pulse rate of a patient.

Another object of the present invention is to provide a novel arterial pulse rate indicator adapted to sense arterial pulses and to generate an electrical signal responsive thereto which is electronically processed so as to selectively operate a loudspeaker for audible presentation or to operate a meter movement for visual display.

Still another object of the present invention is to provide a novel medical pulse analyzer having electromechanical means for sensing and displaying pulse rate information as well as stroke/volume.

Yet another object of the present invention is to provide a novel medical pulse analyzer for not only sensing and displaying pulse rate and pulse stroke/volume, but having means for measuring and displaying systolic blood pressure.

Still another object of the present invention is to provide a novel electromechanical means for sensing and displaying pulse rate of flowing fluid medium of an average medical patient or other subject.

A further object of the present invention resides in providing a novel arterial pulse analyzer incorporating solid state electronic components which is readily usable for sensing and displaying pulse rate, stroke/volume of each pulse, and blood pressure of infants and invalids which is adapted to keep the inconvenience to the patient to an absolute minimum.

Yet another object of the present invention is to provide an easily readable analogue visual display to the user, who may be nontechnical, and which eliminates erroneous readings often encountered with the conventional "feel" method of determining pulse rate.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENTS

Figure 1:
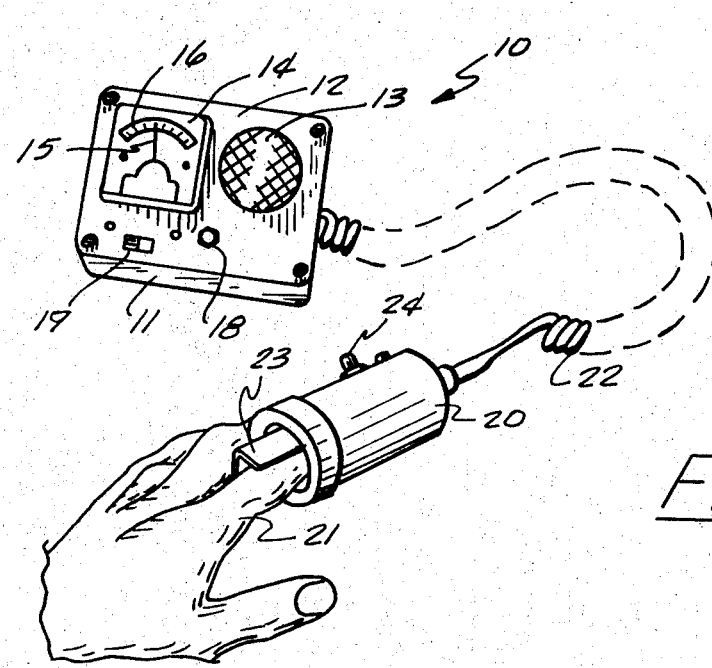
FIG. 1 is a perspective view of the novel medical pulse analyzing apparatus of the present invention.

Referring to FIG. 1, a pulse rate indicator is shown in the direction of arrow 10 which includes a heavy-duty plastic case 11 for holding components of an electrical circuit which is enclosed therein by means of a lid or panel 12. The pulse rate indicator, in accordance with the present invention, provides an audible indication of a patient's pulse via a loudspeaker 13 and a visual indication of the patient's pulse rate via a meter 14. The meter 14 includes a needle 15 which moves across a gradient scale 16. A slide switch 19 is provided for disconnecting the battery when operating power is not desired. Also, for checking the condition of the battery for powering the electrical circuit, a battery test button 18 is provided through the panel 12.

An electronic sensor 20 is employed which is placed on the patient's finger 21. The sensor is cylindrical and includes a conventional photoelectric sensing means which translates the arterial pulse in the finger into an electrical signal which is coupled to the circuitry within container or case 11 via an extendable cord 22. The sensor 20 includes a self-locating mechanism employing a V-shaped sensor bar 23 which is operable in combination with a spring loaded plunger 24 so as to automatically compensate for finger size from that of a small child to an adult. The cord 22 also couples the photoelectric means included in the cylindrical housing of the sensor 20 with the battery in the case 11.

Figure 2:
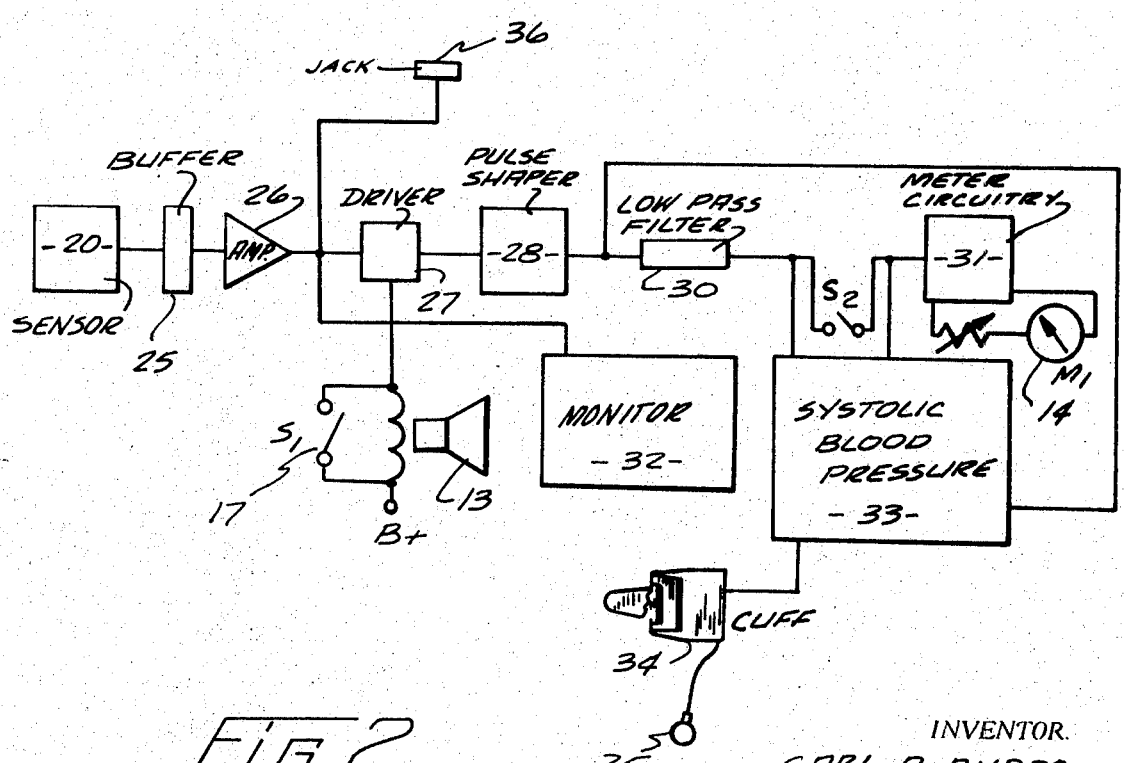
FIG. 2 is a block diagram of the electromechanical system incorporated in the apparatus of FIG. 1.

Referring now to FIG. 2, the basic pulse rate indicator of the medical pulse analyzer comprises a buffer circuit 25 which is used to electrically isolate the sensor 20 from subsequent circuitry. The buffer circuit also presents a high input impedance to the sensor and therefore does not allow degradation of the generated signals supplied therefrom. The output of the buffer is coupled to an amplifier 26 which provides suitable gain to power a circuit driver 27. Output of the driver is connected to a pulse shaper 28. The function of the pulse shaper is to provide suitable electrical pulses of uniform amplitude and duration to a low pass filter 30. The low pass filter removes the AC component of the pulses using a DC voltage which is directly proportional to the rate of incoming pulses provided from the sensor 20. The output of the low pass filter is connected to meter circuitry 31 which comprises essentially a differential amplifier with an addition of an extremely high input impedance. The reason for the extremely high input impedance will be discussed in connection with the detailed circuit description.

The inclusion of a switch S-1, identified by numeral 17, connected across the speaker coil affords the user an opportunity to selectively deactivate the speaker and thereby eliminate the audible click indicative of a sensed pulse. A second switch S-2 may be added between the output of the low pass filter and the input to the meter circuitry for the purpose of holding the voltage present at the output of the low pass filter when switch S-1 is thrown open. This eliminates wandering of the meter indicator needle 15 due to irregularities in pulse input.

A feature of the invention resides in the provision of a pulse monitor 32 that may be connected to the indicator circuit between the amplifier 26 and driver 27. If desired, a suitable switch may be employed for achieving such an interconnection. The pulse monitor rapidly provides visual evidence of pending circulatory disorder or failure. Pulse rate and cardiac stroke/volume are simultaneously displayed by two independent meters including meter 14.

Furthermore, means may be provided, if desired, for measuring and displaying systolic blood pressure as indicated by numeral 33 coupled between the pulse shaper 28 and the low pass filter as well as between the low pass filter and the meter circuitry 31. An occluding cuff 34 is employed which is adapted to be wrapped about the arm of the patient and a suitable bulb 35 is employed for inflating the cuff. A record jack 36 may be provided for accommodating the recording of signals, if desired, on a remote instrument.

Figure 3:
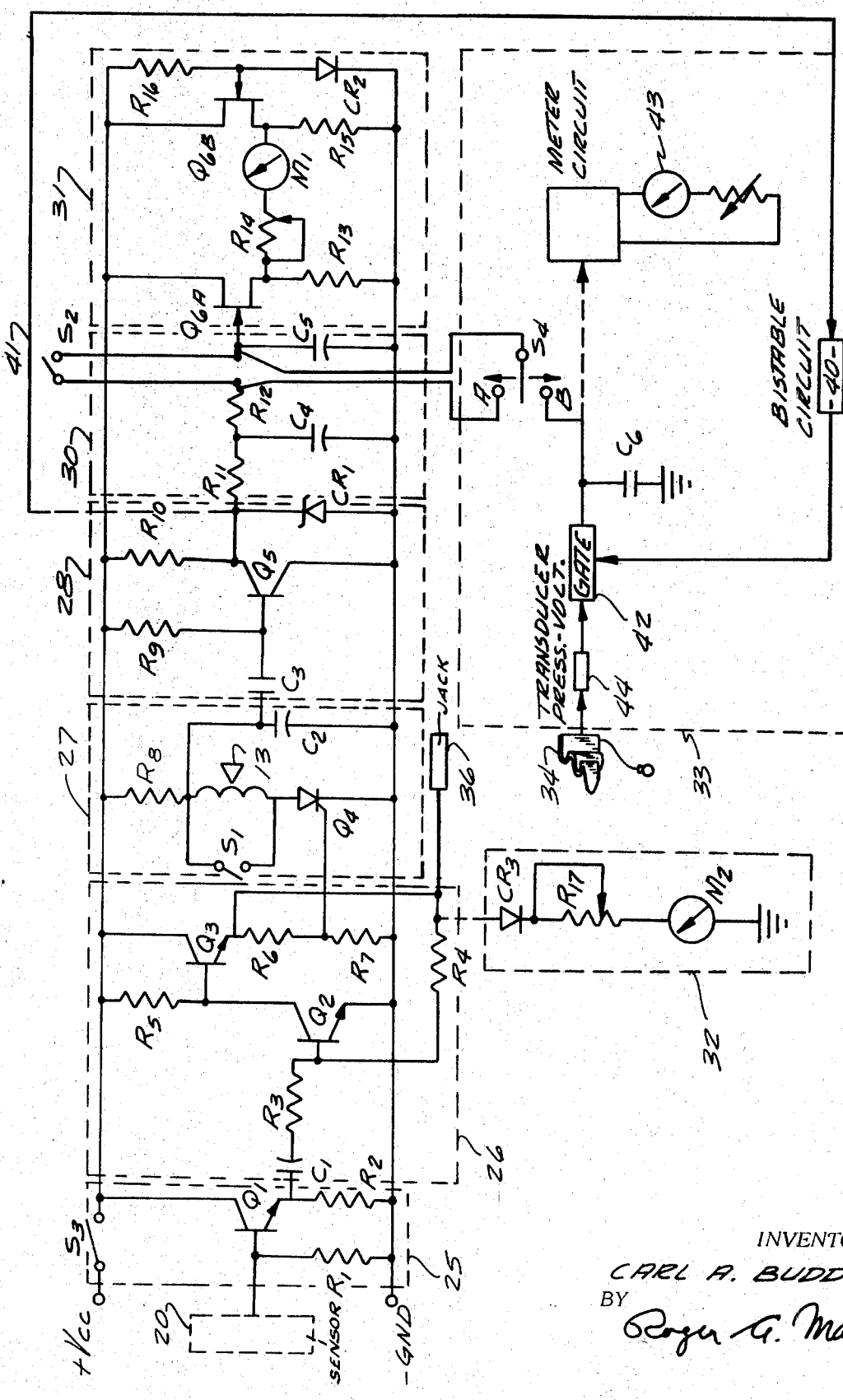
FIG. 3 is a schematic diagram of the electrical circuit embodied in the system block diagram of FIG. 2.

Referring now to FIG. 3 in detail, resistor R-1 in conjunction with appropriate sensor circuitry, provides a bias to transistor Q-1 which function as the buffer stage 25 previously described. Capacitor C-1 couples the output of the buffer into the amplifier 26 consisting of transistors Q-2 and Q-3. R-5 is the load resistor, R-3 is the input resistor and R-4 is the feedback resistance for this amplifier circuit. The reactive component of C-1 in series with the resistive component R-3 divided into the valve of the feedback resistor R-4 and will establish a gain for this amplifier which is preset approximately 100/1 for an input rate of 1 pulse per second.

Transistor Q-3 in the amplifier stage serves to maintain high gain by isolating the amplifying portion from the speaker driver. Speaker driver Q-4 is an SCR which is gated ON by the output signal of the amplifier. Resistor R-8 is used to charge capacitor C-2. The value of this resistor is selected to be such that when Q-4 is switched ON, the current supplied by R-8 will be insufficient to maintain conduction of Q-4. This allows Q-4 to work in a pulse active mode. Capacitor C-2 which is charged during the OFF time of Q-4 transfers a large packet of current during the time that Q-4 is turned ON through the speaker coil. This causes a large amount of instantaneous power to be dissipated in the speaker coil which produces an audible clicking sound at each pulsation.

The output of the driver is coupled through capacitor C-3 to the shaper circuitry transistor Q-5. Capacitor C-3 in conjunction with R-9 performs the timing function for the shaper circuit 28. The time is set to be approximately 100 milliseconds in duration. Transistor Q-5 is operated as a normally saturated switch with bias supplied by resistor R-9. Zener diode CR-1 provides a clamping action on the voltage amplitude when transistor Q-5 is switched OFF by the action of a negative-going input from the driver. CR-1 is added to the circuit to enable the overall circuitry to operate reliably and efficiently at decreased battery voltages. Resistors R-11, R-12 and capacitors C-4 and C-5 comprise the low pass filter previously discussed.

A pair of matched field effect transistors Q-6A and Q-6B in conjunction with resistors R-13, R-15 and variable resistor R-14, and the meter M-1 biasing resistor R-15 and biasing diode CR-2, make up the meter circuitry. Matched filed effect transistors are employed in this circuit and provide, as previously mentioned, a high input impedance stage for the output of the low pass filter. This is especially necessary if degradation of low pass filter circuit output is to be avoided. An additional advantage of using this type of stage is that when switch S-2 is added as shown in broken lines and is opened, the voltage stored on capacitor C-5 will be maintained or stored for an extremely long time. During of which is primarily determined by the time constant as derived by the leakage current of the field effect transistor being typically in the sub nano-amp region and capacitor C-5. Typically the amount of degradation experienced is less than 1 percent per hour. Diode CR-2 in the meter circuitry is used to eliminate the offset potential introduced by the saturated shaper switch Q-5. Q-5 output with no pulses applied to its input is normally approximately 200 millivolts. An input directly applied to the meter circuitry of this magnitude would normally cause the meter to deflect to approximately midscale. By adding CR-2 and supplying a small amount of bias current to it from R-16, a 200 millivolt potential can be approximated at the input to Q-6B which tends to eliminate the Q-5 offset potential.

An additional application of the previously described basic indicator circuitry is the inclusion of the monitor portion 32. The monitor portion consists of a diode labeled CR-3, a variable gain control R-17 and a second meter M-2. The output of the amplifier is connected to the anode side of CR-3 inasmuch as the output from said amplifier receives a positive-going pulse which then couples through R-17 to M-2. Each time a pulse is present at the output of the amplifier, the meter M-2 is caused to deflect. The amount of deflection can be adjusted by variable resistor R-17. Once resistor R-17 has been set to a position which may be considered a normal amount of deflection per given individual, increased meter needle deflection will indicate an increase in stroke/volume or the amount of blood delivered during each pulsation and likewise, decreased needle deflection will indicate a loss in the amount of blood being delivered. This function is known as "stroke/volume" or "tissue perfusion."

A further extension of the basic pulse rate indicator circuitry consists of the inclusion of a means for measuring and displaying systolic blood pressure. This means requires the use of the finger sensor 20. An occluding cuff is employed which is placed around a patient's upper arm and is connected to a transducer 44 which provides an electrical output equivalent to the pressure input that is then subsequently coupled to a gating device 42 and to capacitor C-6. The output of the pulse shaper is coupled to a bistable circuit 40 via lead 41. The bistable circuit is used to turn OFF the gate 42 in the systolic blood pressure monitoring portion. Switch S-4 can be used to couple the output of capacitor C-6 into the already existing pulse rate indicator meter circuitry. In this manner, the same meter circuitry is employed to display both pulse rate and systolic blood pressure. When S-4 is in position A, pulse rate will be displayed on meter M-1 and when switch S-4 is placed in position B, systolic blood pressure will be displayed on a meter 43. The gate 42 may consist of two diodes and a resistor or a suitable transistor switch may be employed either unipolar or bipolar. The bistable circuit 40 can be either a flip-flop, another SCR as previously used, or any other suitable latching device.

Systolic blood pressure is measured by placing the occluding cuff 34 on the patient's arm and inflating the cuff by pumping bulb 35 to a suitable pressure to restrict the blood flow in the patient's artery. This is detected by the lack of audible response from the speaker 13 in the pulse detection portion. As the pressure in the cuff is allowed to escape, a point will be reached where the pressure in the cuff is just equal to the peak arterial blood pressure or systolic. At this time, blood will start to pass by the cuff into the distal portion of the arm or down to the hand where this pulsating flow will now be detected by the finger sensor 20. At the first blood pulsation, an audible click will be heard in the speaker. At the same time, output from the pulse shaper, which is coupled to the bistable circuit, trips the bistable circuit causing it to hold in a condition which opens the gate 42. At this particular time, the voltage on capacitor C-6 will be proportional to (1) the voltage output of the pressure transducer 44 and (2) the pressure in the cuff. The output from C-6 as previously described, can be coupled to switch S-4 to the already existing meter circuitry. However, this is not mandatory. A second meter circuit connected directly to C-6 can also be used. This meter circuitry would be identical to the previously discussed meter circuitry.

In addition to the already described finger sensor for detecting pulsations in blood at the finger, additional sensors or adapters may be utilized in connection with this circuitry. These may be represented by an EKG amplifier adapter or a suitable sensor for detecting respiration as an elastomer band placed around the patient's chest.

Therefore, it can be seen that the medical pulse analyzer of the present invention provides a novel means for performing a variety of functions adapted to derive meaningful information from a patient's pulse. The pulse rate indicator portion of the invention contributes to fulfilling legal requirements which a doctor must provide by establishing the patient's condition during surgery when a local anesthetic is used. Anaesthesiologists find that this low cost, compact instrument is ideal for monitoring the pulse rate while administering the anesthesia. In addition to surgery, the versatility of the present invention also has wide application in hospitals, clinics, physicians' offices, ambulances and convalescent homes. The pulse rate indicator portion is simple to operate and can be used by an individual having a lack of medical skills either in his home or office unaided by anyone else. Because the device operates quickly and accurately, every variation in pulse rate caused by heart-accelerating medication is detected and this device is invaluable to sufferers of such respiratory disorders as asthma, bronchitis and emphysema.

In operating the device or analyzer, the spring-loaded plunger 24 carried on the sensor 20 is depressed. The patient's finger is inserted into the bore of the tubular cylinder on the sensor bar, preferably with the nail facing upward, into the sensor housing. The plunger is released and the sensor bar will automatically compensate for any variation in finger size from that of a small child to that of an adult. After approximately three seconds, the first audible click from loudspeaker 13 will be heard and an additional 10 seconds will elapse before a reading of pulse rate appears on the meter 14. When prolonged monitoring is required, the patient's finger may be taped to the finger bar protruding from one end of the sensor housing. This reduces movement and improves performance of the analyzer. It is to be understood that the sensor may be arranged to sense arterial pulse in other parts of the body than the finger such as on a toe, ear, nose, etc.

While particular embodiments of the present invention have been shown and described, it will be obvious to those skilled in the art that changes and modifications may be made without parting from this invention in its broader aspects, and, therefore, the aim in the appended claims is to cover all such changes and modifications as fall within the true spirit and scope of this invention.

I claim:

1. In a medical arterial pulse analyzer, a pulse rate indicator comprising:

photoelectric means for sensing the arterial pulse and for generating an electrical signal in response thereto;

a buffer circuit coupled to said photoelectric means adapted to isolate said photoelectric means from subsequent circuitry;

an amplifier circuit connected to said buffer circuit and having a pair of transistors coupled in a collector-to-base relationship for receiving and increasing the gain of said generated electrical signals;

a driver circuit operably connected to said amplifier including an CR adapted to be gated ON by said increased gain electrical signals introduced from said amplifier so that said SCR functions in a pulse active mode of operation;

an acoustical reproducing means operably coupled to said driver circuit for receiving operating current therefrom during the time said SCR is gated ON for producing an audible sound at each arterial pulsation;

a pulse shaper connected to said driver circuit and adapted to process said electrical signals therefrom to provide pulse signals of uniform amplitude and duration;

a low pass filter coupled to said pulse shaper adapted to receive said pulse signals and remove the AC component of said pulse signals employing a DC voltage which is directly proportional to the rate of received pulse signals from said pulse shaper;

meter circuitry coupled to said low pass filter including a differential amplifier including a pair of matched field effect transistors having high input impedance and a meter movement coupled to said transistors in the circuit adapted to deflect across a scale for visually displaying the arterial pulse rate; and a pulse monitor comprising:

a diode, a variable gain control resistance and a second meter connected in series relationship; and said diode operably coupled to said amplifier so that said second meter will deflect in response to the presence of each of said generated signals to indicate stroke/volume.

2. In a medical arterial pulse analyzer, a pulse rate indicator comprising:

photoelectric means for sensing the arterial pulse and for generating an electrical signal in response thereto;

a buffer circuit coupled to said photoelectric means adapted to isolate said photoelectric means from subsequent circuitry;

an amplifier circuit connected to said buffer circuit and having a pair of transistors coupled in a collector-to-base relationship for receiving and increasing the gain of said generated electrical signals;

a driver circuit operably connected to said amplifier including an SCR adapted to be gated ON by said increased gain electrical signals introduced from said amplifier so that said SCR functions in a pulse active mode of operation;

an acoustical reproducing means operably coupled to said driver circuit for receiving operating current therefrom during the time said SCR is gated ON for producing an audible sound at each arterial pulsation;

a pulse shaper connected to said driver circuit and adapted to process said electrical signals therefrom to provide pulse signals of uniform amplitude and duration;

a low pass filter coupled to said pulse shaper adapted to receive said pulse signals and remove the AC component of said pulse signals employing a DC voltage which is directly proportional to the rate of received pulse signals from said pulse shaper;

meter circuitry coupled to said low pass filter including a differential amplifier including a pair of matched field effect transistors having high input impedance and a meter movement coupled to said transistors in the circuit adapted to deflect across a scale for visually displaying the arterial pulse rate; and systolic blood pressure measuring and displaying means comprising:

an including cuff;

a transducer connected to said cuff for providing an electrical signal equivalent to the pressure of said cuff;

a meter circuit;

a gating means coupled in series relationship between said transducer and said meter circuit;

a capacitor connected in parallel relationship to said transistors between said gating means and said meter circuit; and a bistable circuit interconnected between said gating means and said pulse shaper for controlling the operation of said gating means.

3. The invention as defined in claim 2 including:

switch means interconnected between said capacitor and said first mentioned meter circuitry for coupling the discharge of said capacitor thereto so that said first mentioned meter circuitry may be employed to selectively visually display both pulse rate and systolic blood pressure; and connection means disposed between said switch means and said filter.